(12) United States Patent
Lim

(10) Patent No.: US 8,060,452 B2
(45) Date of Patent: Nov. 15, 2011

(54) SALES METHODS, DELIVERY METHODS, CODE VERIFICATION METHODS, REPUDIATION RESOLUTION METHODS, AND ARTICLES OF MANUFACTURE

(75) Inventor: Kay Hian Lim, Singapore (SG)

(73) Assignee: Comgateway(S) Pte. Ltd, Singapore (SG)

( * ) Notice: Subject to any disclaimer, the term of this patent is extended or adjusted under 35 U.S.C. 154(b) by 1124 days.

(21) Appl. No.: 11/770,876

(22) Filed: Jun. 29, 2007

(65) Prior Publication Data

US 2009/0001153 A1    Jan. 1, 2009

(51) Int. Cl.
G06Q 30/00    (2006.01)
(52) U.S. Cl. ......... 705/332; 705/330; 705/336; 705/337
(58) Field of Classification Search .................. 705/330, 705/332, 336, 337
See application file for complete search history.

(56) References Cited

U.S. PATENT DOCUMENTS

| | | | |
|---|---|---|---|
| 7,242,279 B2 * | 7/2007 | Wolfe | 340/5.9 |
| 7,341,186 B2 * | 3/2008 | Mrozik et al. | 235/384 |
| 7,454,356 B2 * | 11/2008 | Fields et al. | 705/330 |
| 7,877,315 B2 * | 1/2011 | Pickering | 705/37 |
| 2001/0029472 A1 | 10/2001 | Hataguchi | |
| 2002/0046056 A1 | 4/2002 | Demarco et al. | |
| 2002/0091537 A1 * | 7/2002 | Algazi | 705/1 |
| 2002/0099567 A1 * | 7/2002 | Joao | 705/1 |
| 2005/0006470 A1 * | 1/2005 | Mrozik et al. | 235/385 |
| 2005/0038758 A1 | 2/2005 | Hilbush et al. | |
| 2005/0071247 A1 * | 3/2005 | Kelley et al. | 705/26 |
| 2005/0187836 A1 | 8/2005 | Wolfe | |
| 2007/0050236 A1 * | 3/2007 | Esposito-Ross et al. | 705/10 |
| 2008/0004995 A1 * | 1/2008 | Klingenberg et al. | 705/28 |
| 2009/0216663 A1 * | 8/2009 | White | 705/28 |

FOREIGN PATENT DOCUMENTS

DE    10034727 A1 *    1/2002

OTHER PUBLICATIONS

Anon., "Parceline Improves Barcode-Labelling of Consignments," Freight News Express, Jan. 1992, p. 7.*
Lien, C., "Becoming LACSLink Tolerant," Graphic Arts Monthly, vol. 79, No. 5, p. 52, May 1, 2007.*
WO PCT/US08/068500 Search Rpt, Jan. 21, 2009, Gateway Express Inc. et al.
WO PCT/US08/068500 Writ.Opinio, Jan. 21, 2009, Gateway Express Inc. et al.

* cited by examiner

Primary Examiner — Nicholas D Rosen
(74) Attorney, Agent, or Firm — Wells St. John, P.S.

(57) ABSTRACT

A sales method includes accepting an order for goods from a customer, providing a code associated with the goods to the customer, and receiving the code from the customer prior to delivering the goods. A code verification method includes providing a code associated with goods ordered by a customer to the customer and receiving a verification request from a delivery agent tendering delivery of the goods to the customer. The verification request includes an asserted code provided by the customer. The method also includes determining whether the asserted code is the code previously provided to the customer. A repudiation resolution method includes receiving a request to reverse a credit charge for a purchase of goods from a customer and determining whether the customer provided a code associated with the goods to a delivery agent in response to the delivery agent tendering delivery of the goods to the customer.

25 Claims, 4 Drawing Sheets

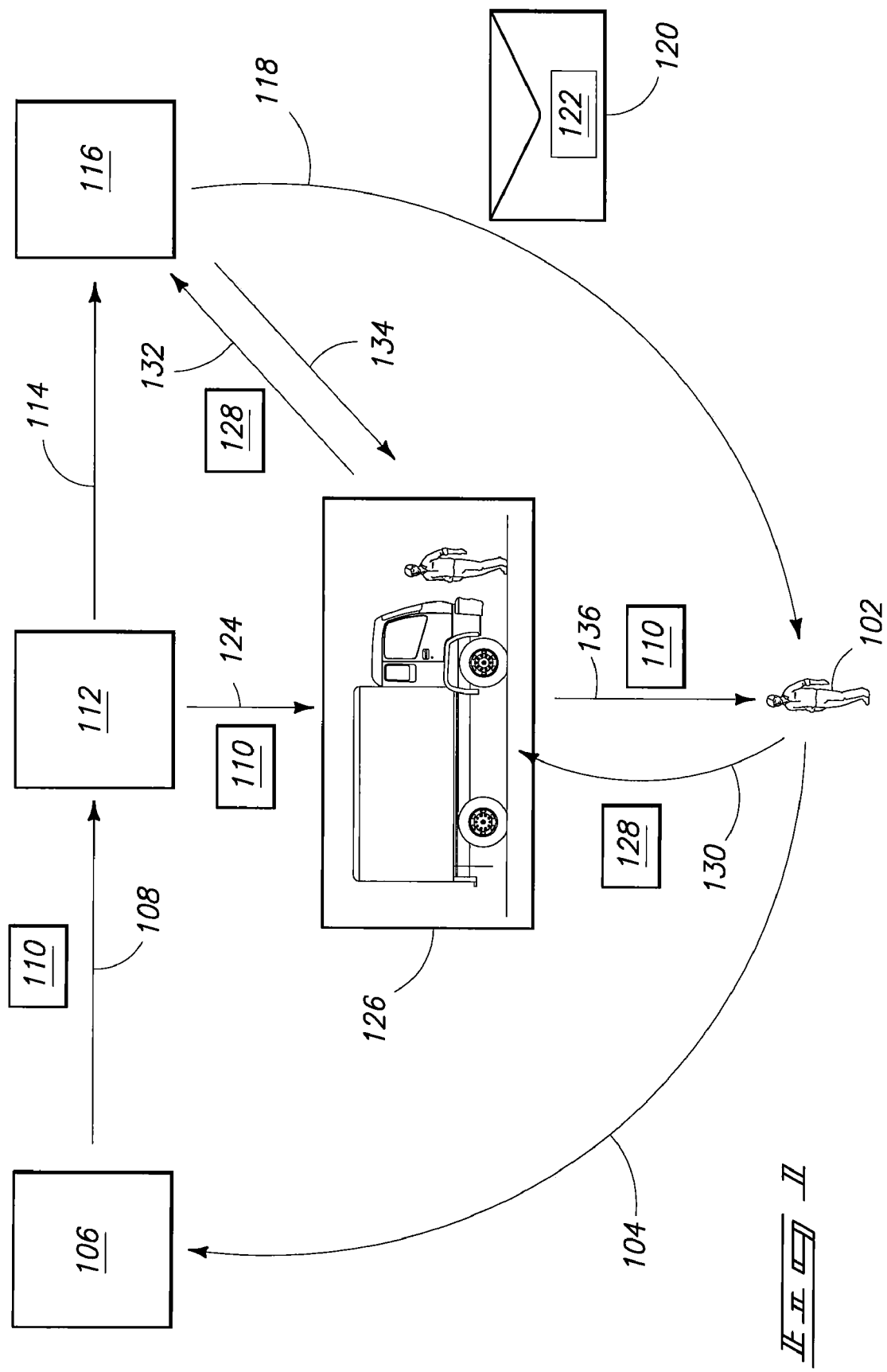

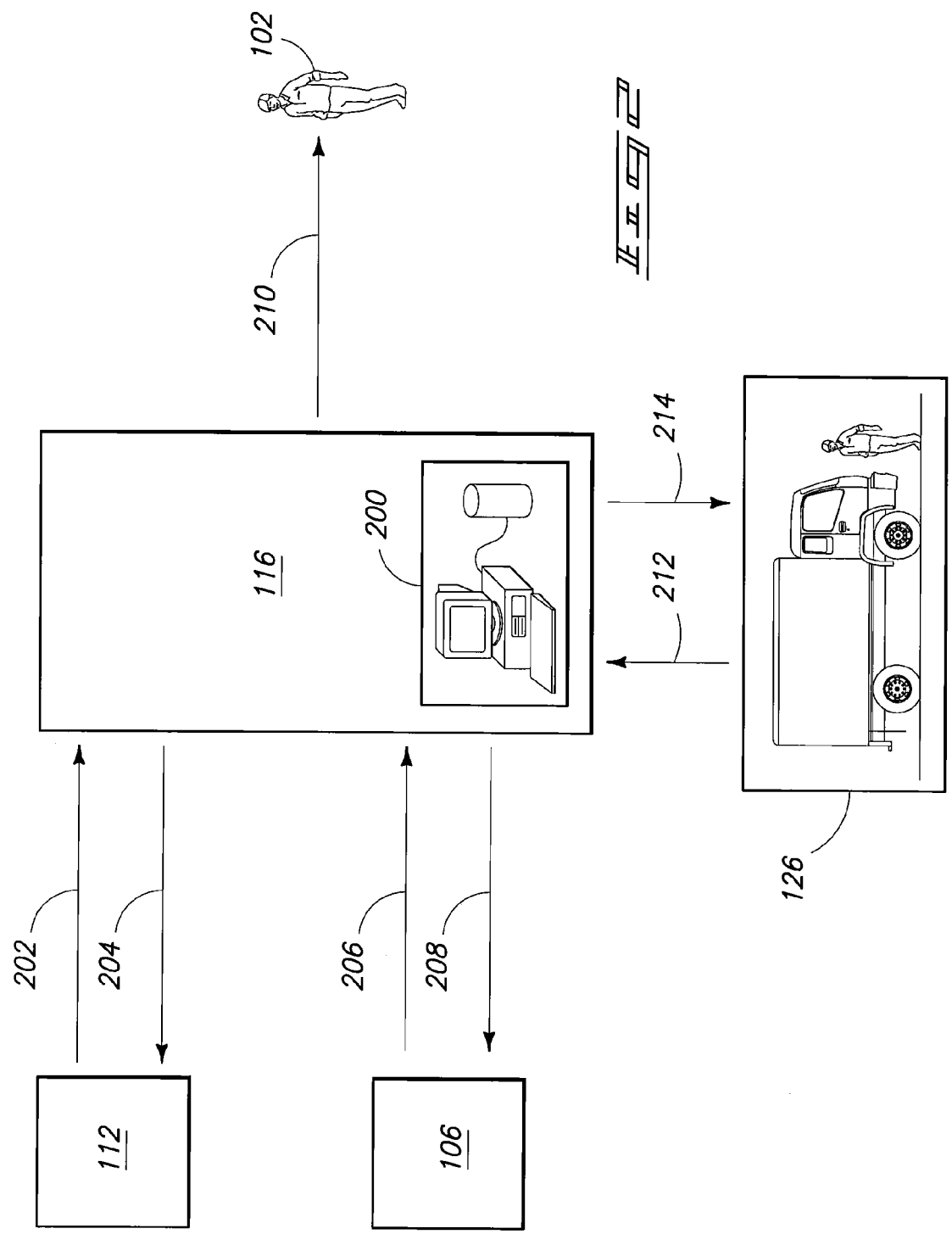

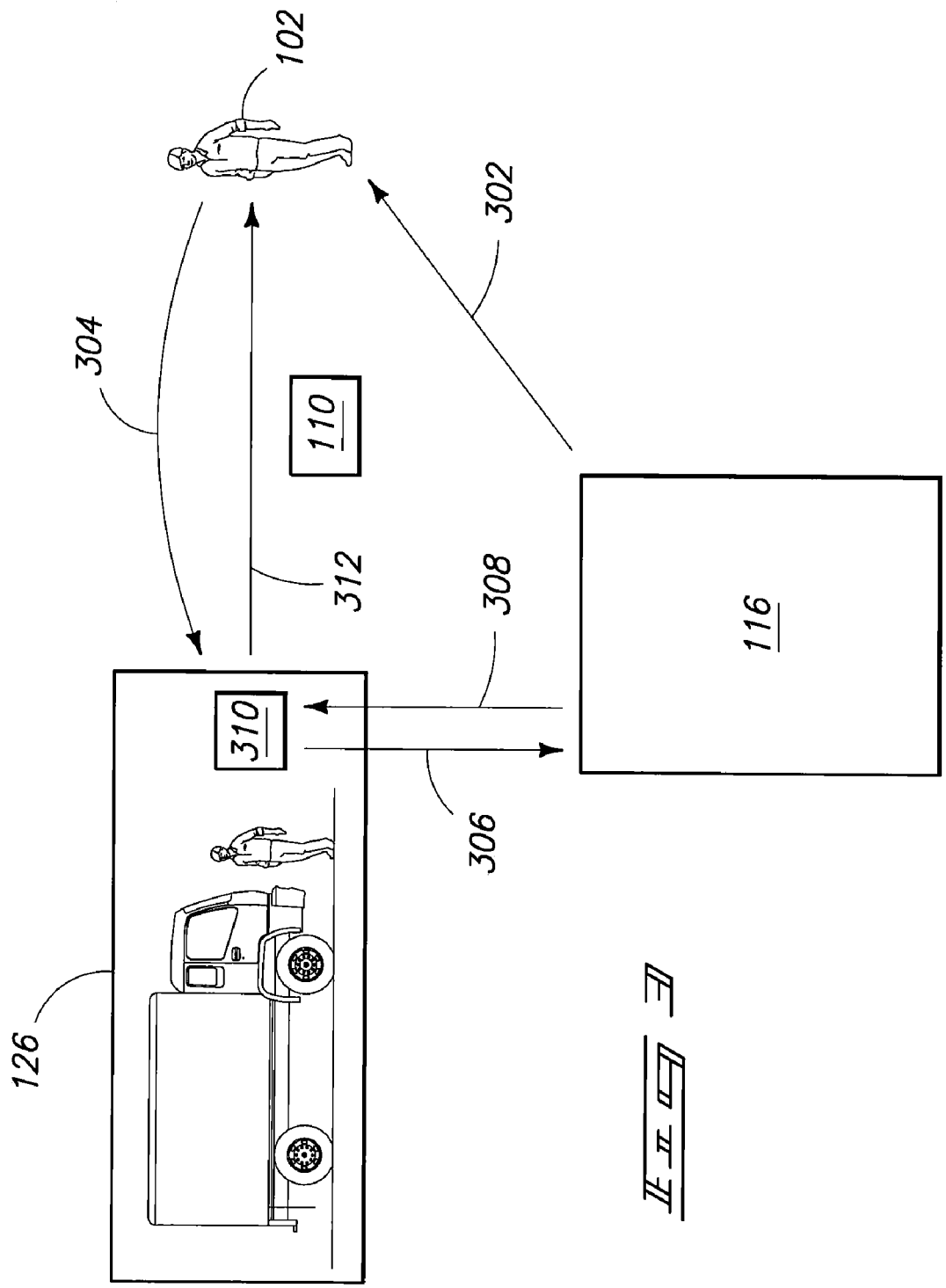

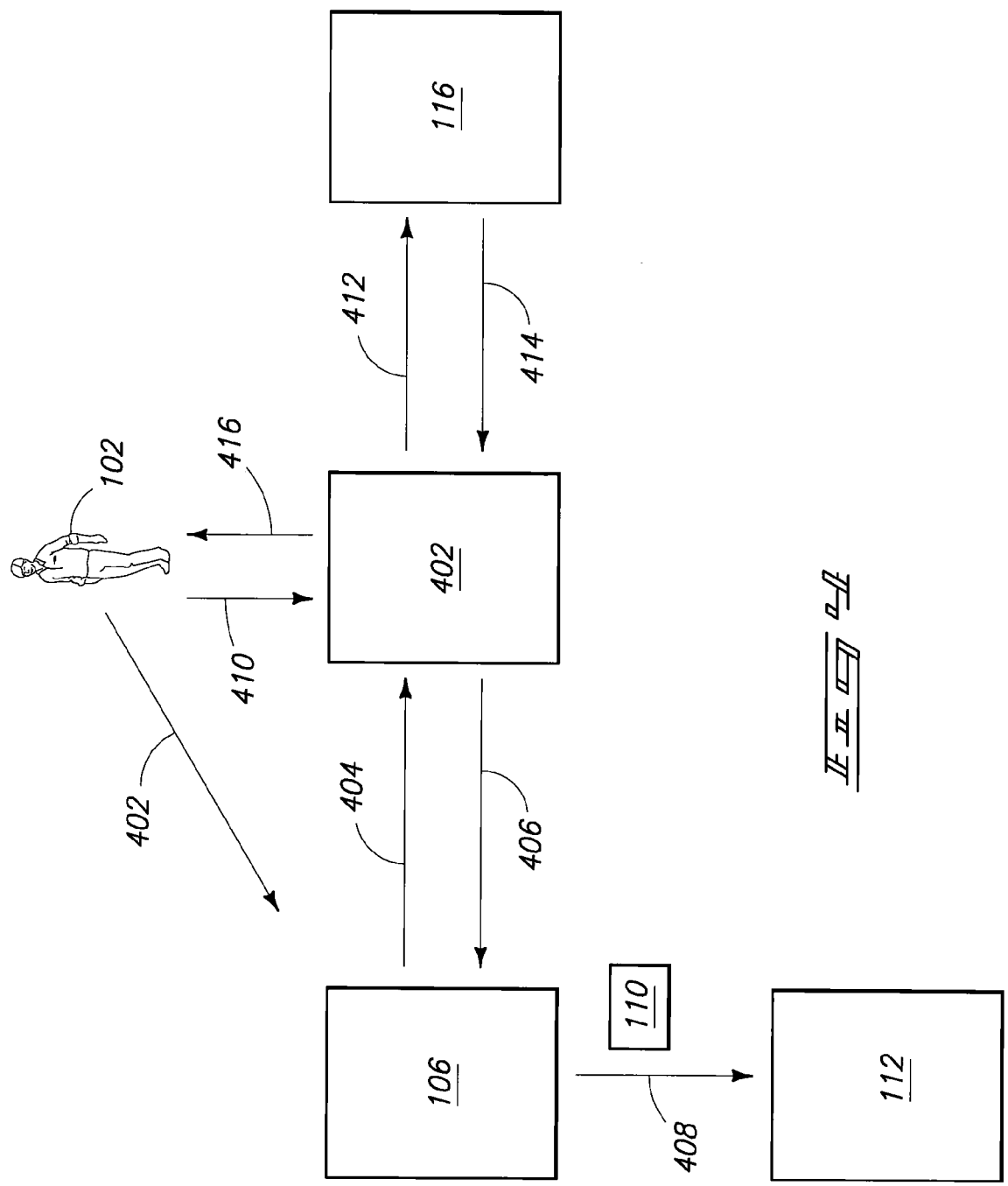

SALES METHODS, DELIVERY METHODS, CODE VERIFICATION METHODS, REPUDIATION RESOLUTION METHODS, AND ARTICLES OF MANUFACTURE

TECHNICAL FIELD

The present disclosure, in various embodiments, relates to sales methods, delivery methods, code verification methods, repudiation resolution methods, and articles of manufacture.

BACKGROUND OF THE DISCLOSURE

The rise of the internet has led to an increase in the number of parcels shipped to customers who make purchases of goods online. Some customers attempt to repudiate online purchases claiming that they did not receive the goods purchased. Known shipping agencies attempt to mitigate repudiation by requiring a signature in exchange for delivery of a parcel and using the signature as evidence that the parcel was indeed received.

However, in some cases a delivery agent may forge the signature of a consignee of a parcel and keep the parcel rather than delivering it to the consignee. In other cases, a consignee may provide a signature to a delivery agent in exchange for a parcel and then later dishonestly claim that the signature provided is not his or her own signature. In either case, a credit provider that extended credit for the repudiated purchase may end up bearing the burden of reversing a charge made for the repudiated purchase.

SUMMARY OF THE DISCLOSURE

According to one aspect of the disclosure, a sales method includes accepting an order for goods from a customer, providing a code to the customer, and receiving the code from the customer prior to delivering the goods. The code is associated with the goods.

According to another aspect of the disclosure, a delivery method includes accepting an order for goods from a customer, requesting that a verification agency provide a code to the customer, and providing the goods to a shipping agency. The code is associated with the goods and the shipping agency is instructed to deliver the goods to the customer after receiving the code from the customer.

According to another aspect of the disclosure, a code verification method includes providing a code to a customer. The code is associated with goods ordered by the customer. The method further includes receiving a verification request from a delivery agent tendering delivery of the goods to the customer. The verification request includes an asserted code provided by the customer. The method also includes determining whether the asserted code is the code previously provided to the customer.

If the asserted code is the code previously provided to the customer, the method includes informing the delivery agent that the asserted code has been verified. In contrast, if the asserted code is not the code previously provided to the customer, the method includes informing the delivery agent that the asserted code has not been verified.

According to another aspect of the disclosure, an article of manufacture includes media comprising programming configured to cause processing circuitry to perform code verification processing. The code verification processing includes receiving a verification request from a delivery agent tendering delivery of goods to a customer. The verification request includes an asserted code provided to the delivery agent by the customer. The code verification processing also includes determining whether the asserted code matches a code previously provided to the customer. The previously provided code is associated with the goods.

The code verification processing includes informing the delivery agent that the asserted code has been verified if the codes match, and informing the delivery agent that the asserted code has not been verified if the codes do not match.

According to another aspect of the disclosure, a delivery method includes receiving goods ordered by a customer. The goods are associated with a code provided to the customer. The method also includes receiving an asserted code from the customer and transferring the goods to the customer only if the asserted code is the code provided to the customer.

According to another aspect of the disclosure, a repudiation resolution method includes receiving a request to reverse a credit charge from a customer, the credit charge resulting from a purchase of goods made by the customer. The method also includes determining whether the customer provided a code associated with the goods to a delivery agent in response to the delivery agent tendering delivery of the goods to the customer.

The method also includes refusing to reverse the credit charge if the customer provided the code to the delivery agent and reversing the credit charge if the customer did not provide the code to the delivery agent.

According to another aspect of the disclosure, an article of manufacture includes media comprising programming configured to cause processing circuitry to perform code verification processing. The code verification processing includes receiving an asserted code from a delivery agent, the delivery agent having obtained the asserted code from a customer. The code verification processing also includes transmitting the asserted code to a verification system.

The verification system is configured to determine whether the asserted code matches a code previously provided to the customer. The previously provided code is associated with goods ordered by the customer.

The code verification processing also includes receiving a message from the verification system indicating whether the delivery agent is authorized to transfer the goods to the customer.

BRIEF DESCRIPTION OF THE DRAWINGS

Preferred embodiments of the disclosure are described below with reference to the following accompanying drawings.

FIG. 1 illustrates a sales method in accordance with an aspect of the disclosure.

FIG. 2 illustrates a code verification method in accordance with an aspect of the disclosure.

FIG. 3 illustrates a delivery method in accordance with an aspect of the disclosure.

FIG. 4 illustrates a repudiation resolution method in accordance with an aspect of the disclosure.

DETAILED DESCRIPTION OF THE PREFERRED EMBODIMENTS

Sales methods, delivery methods, code verification methods, repudiation resolution methods, and articles of manufacture will be described below in relation to FIGS. 1-4.

FIG. 1 illustrates a sales method involving a customer 102, a merchant 106, a shipping agency 112, a delivery agent 126, and a verification agency 116. According to the sales method, at 104, merchant 106 accepts an order for goods 110 from customer 102. In response, at 108, merchant 106 provides goods 110 to shipping agency 112 with the understanding that shipping agency 112 will deliver goods 110 to customer 102. Although depicted as a single parcel in FIG. 1, merchant 106 may package goods 110 in a single parcel, a plurality of parcels, or a single parcel containing other goods associated with a different transaction between customer 102 and merchant 106.

Upon receiving goods 110 from merchant 106, shipping agency 112 may create a parcel identifier, such as a tracking number, uniquely identifying a parcel containing goods 110. Shipping agency 112 may communicate the parcel identifier to merchant 106 and/or customer 102 so that merchant 106 and customer 102 may track the location of goods 110. The parcel identifier may be unique in that it may be associated with goods 110 and might not be associated with any other parcel currently being processed by shipping agency 112.

A code 122 may be generated for goods 110 by verification agency 116. Shipping agency 112 may, at 114, request that verification agency 116 send code 122 to customer 102 per an arrangement with merchant 106. Alternatively, merchant 106 may request that verification agency 116 send code 122 to customer 102. Verification agency 116 may associate code 122 with goods 110 and may further associated code 122 with the parcel identifier.

At 118, verification agency 116 provides code 122 to customer 102 by sending a message 120 to customer 102 containing code 122. Message 120 may be an email message, a text message, a short-message-service message, a page, an instant message, a voice message, an automated voice message, a phone call, or other message capable of conveying code 122 to customer 102. Alternatively, message 120 may be programming configured to execute within a web browser. For example, verification agency 116 may send an email message to customer 102 containing a URL. In response to customer 102 clicking on the URL, verification agency 116 may send programming, such as HTML code, XML code, Java code, or other programming capable of being performed by a web browser to a web browser being used by customer 102. The programming, when performed by the web browser, may display code 122 to user 102.

Next, at 124, shipping agency 112 may provide goods 110 to delivery agent 126. Delivery agent 126 may be an employee of shipping agency 112 or may be an independent contractor with whom shipping agency 112 may contract to deliver goods 110 to customer 102.

Shipping agency 112 and delivery agent 126 may be instructed to deliver goods 110 to customer 102 but not to transfer goods 110 to customer 102 until after receiving and validating code 122 from customer 102. Delivery agent 126 may request code 122 from customer 102 because delivery agent 126 might not know code 122 prior to receiving code 122 from customer 102.

The fact that delivery agent 126 might not have code 122 prior to receiving code 122 from customer 102 may reduce fraud committed by delivery agent 126 since delivery agent is unlikely to be able to determine code 122 without receiving code 122 from customer 102.

Furthermore, the fact that customer 102 has code 122 and provides code 122 to delivery agent 126 may reduce fraud committed by customer 102 since customer 102 might not be able to credibly claim that he or she did not provide code 122 to delivery agent 126 after providing code 122 to delivery agent 126 since delivery agent 126 might not have any other way of receiving code 122 other than via customer 102.

At 130, delivery agent 126 may receive an asserted code 128 from customer 102. Asserted code 128 may be code 122. However, delivery agent 126 might not know whether asserted code 128 is code 122 until after verifying asserted code 128 with verification agency 116.

Accordingly, at 132, delivery agent 126 may provide asserted code 128 to verification agency 116. Verification agency 116 may determine whether asserted code 128 is code 122 by comparing asserted code 128 with code 122. If the codes match, at 134, verification agency 116 may notify delivery agent 126 that the codes match. Alternatively, at 134, verification agency 116 may authorize delivery agent 126 to transfer goods 110 to customer 102. In other words, verification agency 116 might not explicitly tell delivery agent 126 whether the codes match, but instead may either authorize or not authorize the transfer of goods 110 to customer 102. If authorized by verification agency 116, delivery agent 126, at 136, may transfer goods 110 to customer 102.

FIG. 2 illustrates a code verification method in accordance with one aspect of the disclosure. At 202, verification agency 116 may receive a request to provide code 122 to customer 102 from shipping agency 112. In response, verification agency 116 may, at 204, acknowledge the request by sending a reply to shipping agency 112 indicating that verification agency 116 will provide code 122 to customer 102. In some embodiments, the request may include a parcel identifier associated with a parcel containing goods 110.

Alternatively, at 206, verification agency 116 may receive a request to provide code 122 to customer 102 from merchant 106. In response, verification agency 116 may, at 208, acknowledge the request by sending a reply to merchant 106 indicating that verification agency 116 will provide code 122 to customer 102. In some embodiments, the request may include a parcel identifier associated with a parcel containing goods 110. Merchant 106 may obtain the parcel identifier from shipping agency 112.

In response to the request, verification agency 116 may generate code 122. In doing so, verification agency 116 may store an association between code 122 and goods 110. In some embodiments, verification agency 116 may store an association between code 122 and the parcel identifier associated with goods 110. The association may be stored in a computer 200.

Code 122 may include a random or pseudo random arrangement of a plurality of characters. For example, code 122 may be a set of randomly selected letters and numbers. Alternatively, code 122 may be a picture, icon, or other visual identifier. For example, code 122 may be a bar code.

Verification agency 116 may create a plurality of codes and may associate each of the plurality of codes with different goods. In one embodiment, verification agency 116 may ensure that each code of the plurality of codes is unique. In other words, each code may be associated with different goods and verification agency 116 may ensure that code 122 is only associated with goods 110.

In another embodiment, verification agency 116 may receive a parcel identifier associated with goods 110. Verification agency 116 may ensure that the combination of code 122 and the parcel identifier is unique. In other words, a same code may be used for more than one set of goods as long as the sets of goods have different parcel identifiers.

Code 122 may be a one-time use code meaning that code 122 may be associated with goods 110 and might not be associated with other goods in the future even after goods 110 have been transferred to customer 102.

At 210, verification agency 116 may provide code 122 to customer 102 via message 120. Next, at 212, verification agency 116 may receive a verification request from delivery agent 126. Delivery agent 126 may attempt to deliver goods 110 to customer 102 but may first need to verify that asserted code 128 provided by customer 102 is code 122. Accordingly, the verification request may include asserted code 128 and may also include a parcel identifier associated with goods 110. In some embodiments of the method, delivery agent 126 may receive the parcel identifier from shipping agency 112.

In some embodiments of the method, verification agency 116 may receive the verification request via a telephone call from delivery agent 126. Before receiving the telephone call, verification agency 116 may check a telephone number of a caller identification associated with the telephone call to see if the telephone number is a known, authorized telephone number. If the telephone number is an authorized number, verification agency 116 may answer the telephone call and may thereby receive the verification request. If the telephone number is not an authorized number, verification agency 116 might not answer the telephone call. This practice may prevent unauthorized parties from fraudulently attempting to verify asserted codes with verification agency 116.

Further steps may also be taken to prevent fraud. For example, if verification agency 116 receives an asserted code that does not match code 122, verification agency 116 may note that a failed match occurred. Additional failed matches may subsequently occur. Verification agency 116 may, after a predetermined number of failed matches or after a predetermined number of failed matches within a predetermined time period, invalidate code 122 since it may appear that someone is fraudulently trying to authorize a transfer of goods 110 by "guessing" code 122.

Verification agency may subsequently notify merchant 106 and may subsequently issue a new code to replace code 122. The new code may be sent to customer 102 in a manner similar to the manner in which code 122 was sent to customer 102. This approach may prevent fraudulent authorizations.

Instead of a phone call, verification agency 116 may receive the request electronically. For example, verification agency 116 may receive an email message from delivery agent 126 or other message electronically sent by delivery agent 126. In some embodiments, the electronic request may be received by computer 200.

In response to the request received at 212, verification agency 116 may compare asserted code 128 with code 122 to determine if asserted code 128 is code 122. If asserted code 128 matches code 122, verification agency 116 may make a record of the date and time when it determined that asserted code 128 matches code 122. The record may include other information as well. For example, the record may include an identifier identifying delivery agent 126, the parcel identifier associated with goods 110, an identifier identifying merchant 106, an identifier identifying customer 102, and/or other information.

If the codes match, verification agency 116 may send an authorization message to delivery agent 126 at 214. The authorization message may indicate that the codes match or may simply indicate that delivery agent 126 is authorized to transfer goods 110 to customer 102.

If the codes do not match, verification agency 116 may send a message to delivery agent 126 at 214 indicating that delivery agent 126 is not authorized to transfer goods 110 to customer 102. The message may further indicate that the codes do not match.

Verification agency 116 may take steps to ensure that shipping agency 112 and delivery agent 126 do not obtain code 122. For example, verification agency 116 may send code 122 only to customer 102 and not to shipping agency 112 or delivery agent 126. Verification agency 116 may also ensure that shipping agency 112 and delivery agent 126 cannot access code 122 via computer 200.

In some embodiments, verification agency 116 and merchant 106 may be part of a single business entity. In other cases, verification agency 116 may be independent of merchant 106 and may service many different merchants. In some embodiments, verification agency 116 may be part of shipping agency 112. For example, shipping agency 112 may offer verification services to customers. However, for this arrangement to be feasible, shipping agency 112 may need to assure merchant 106 that delivery agent 126 could not access code 122 even though verification agency 116 may be part of the same business entity as shipping agency 112.

The code verification method may be executed manually or semi-manually by verification agency 116. Alternatively, the code verification method may be implemented as code verification processing configured to be performed on processing circuitry. For example, according to another aspect of the disclosure, an article of manufacture includes media including programming configured to cause processing circuitry (e.g., a microprocessor) to perform processing that executes the code verification method. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette), zip disk, hard drive, random access memory, read only memory, flash memory, cache memory, and/or other configurations capable of storing programming, data, or other digital information.

FIG. 3 illustrates a delivery method in accordance with one aspect of the disclosure. Initially, delivery agent 126 receives goods 110 ordered by customer 102 from merchant 106. Customer 102, at 302, receives code 122 from verification agency 116.

Before transferring goods 110 to customer 102, delivery agent 126 requests code 122 from customer 102. At 304, customer 102 provides asserted code 128 to delivery agent 126. Delivery agent 126 may presume that asserted code 128 is code 122.

At 306, delivery agent 126 sends asserted code 128 to verification agency 116 and requests that verification agency 116 verify asserted code 128. In response, verification agency 116 compares asserted code 128 to code 122. At 308, if asserted code 128 matches code 122, verification agency 116 may authorize delivery agent 126 to transfer goods 110 to customer 102. Delivery agent 126 then transfers goods 110 to customer 102 at 312.

If asserted code 128 does not match code 122, verification agency 116, at 308 may inform delivery agent 126 that he or she is not authorized to transfer goods 110 to customer 102.

Delivery agent 126 may provide asserted code 128 to verification agency 116 via a telephone call. Alternatively, delivery agent 126 may be provided with a communications device 310 configured to provide asserted code 128 to verification agency 116. Communications device 310 may be substantially any device capable of electronically sending asserted code 128 to verification agency 116 and receiving messages from verification agency 116. For example, communications device 310 may be a laptop computer, a personal digital assistant, or a handheld computer.

Communications device 310 may be configured to perform processing related to verifying asserted code 128. The processing may be embodied as programming configured to perform the processing. The processing may include receiving asserted code 128 from delivery agent 126, transmitting asserted code 128 to verification agency 116, and receiving a message from verification agency 116 indicating whether delivery agent 126 is authorized to transfer goods 110 to customer 102. The processing may further include informing delivery agent 126 whether delivery agent 126 is authorized to transfer goods 110 to customer 102. In some cases, the processing may receive asserted code 128 via a keyboard or via a bar code reader.

The processing may be embodied as an article of manufacture including media including the programming. The programming may be embodied in a computer program product (s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette), zip disk, hard drive, random access memory, read only memory, flash memory, cache memory, and/or other configurations capable of storing programming, data, or other digital information.

FIG. 4 illustrates a repudiation resolution method in accordance with one aspect of the disclosure. Initially, at 402, customer 102 orders goods 110 from merchant 106. In doing so, customer 102 may provide merchant 106 with credit card information by which customer 102 intends to pay for goods 110. Upon receiving the credit card information, merchant 106 may request, at 404, payment from a credit provider 402 associated with the credit card information. In response, credit provider 402 may authorize payment at 406.

Merchant 106 may then, at 408, provide goods 110 to shipping agency 112 and instruct shipping agency 112 to deliver goods 110 according to one of the methods of the disclosure.

Credit provider 402 may subsequently, at 410, receive a request to reverse the credit charge from customer 102. Before reversing the credit charge, credit provider 402 may contact verification agency 116 to determine whether customer 102 provided code 122 to delivery agent 126. At 412, credit provider 402 may request that verification agency 116 provide verification information associated with goods 110. In doing so, credit provider 402 may provide a parcel identifier identifying goods 110 to verification agency 116. Verification agency 116 may, in response, retrieve recorded information related to goods 110 and at 414 provide the recorded information to credit provider 402.

The recorded information may indicate that verification agency 116 received asserted code 128 from delivery agent 126 and verified that asserted code 128 is code 122. In this case, credit provider 402 may assume that customer 102 received goods 110 from delivery agent 126 since presumably customer 102 provided code 122 to delivery agent 126 and delivery agent 126 did not have access to code 122 other than via customer 102. Accordingly, at 416, credit provider 402 may inform customer 102 that credit provider 402 will not reverse the credit charge.

Alternatively, the recorded information may indicate that verification agency 116 either received asserted code 128 from delivery agent 126 and determined that asserted code 128 is not code 122 or that verification agency 116 did not receive asserted code 128 from delivery agent 126. In this case, credit provider 402 may assume that customer 102 did not receive goods 110 from delivery agent 126. Accordingly, at 416, credit provider 402 may inform customer 102 that credit provider 402 will reverse the credit charge.

Credit provider 402 may subsequently attempt to recover the amount of the credit charge from shipping agency 112 if credit provider 402 can establish that merchant 106 did provide goods 110 to shipping agency 112.

This method may reduce the number of fraudulent repudiations asserted by customers thereby reducing costs for credit provider 402 and merchant 106.

In compliance with the statute, the disclosure has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A code verification method comprising:
   providing a code to a customer, the code being associated with goods ordered by the customer;
   receiving a verification request from a delivery agent tendering delivery of the goods to the customer, the verification request including an asserted code provided by the customer;
   determining whether the asserted code is the code previously provided to the customer;
   communicating a message comprising one or more words or symbols to the delivery agent in response to determining whether the asserted code is the code previously provided to the customer;
   if the asserted code is the code previously provided to the customer, the message comprising one or more words or symbols comprising a directive for the delivery agent to physically transfer the goods to the customer; and
   if the asserted code is not the code previously provided to the customer, the message comprising one or more words or symbols comprises a directive for the delivery agent to not physically transfer the goods to the customer.

2. The method of claim 1 further comprising receiving a request to provide the code to the customer and generating the code in response to receiving the request.

3. The method of claim 2 wherein the request is received from a shipping agency associated with the delivery agent.

4. The method of claim 2 wherein the request is received from a merchant of the goods.

5. The method of claim 1 further comprising storing a date and time of the verification.

6. The method of claim 1 further comprising preventing the delivery agent from acquiring the code except from the customer.

7. The method of claim 1 wherein the verification request includes a parcel identifier uniquely identifying a parcel containing the goods, the parcel identifier being known by the delivery agent prior to sending the verification request and being associated with the code.

8. The method of claim 7 wherein the combination of the parcel identifier and the code is unique.

9. The method of claim 7 wherein the code is not unique, and the combination of the parcel identifier and the code is unique.

10. The method of claim 1 wherein the receiving the verification request comprises receiving the verification request via a telephone call from the delivery agent.

11. The method of claim 10 further comprising determining that a telephone number of a caller identification associated with the telephone call is an authorized telephone number prior to receiving the verification request.

12. The method of claim 1 wherein the receiving the verification request comprises receiving an electronic message transmitted by the delivery agent.

13. The method of claim 1 wherein the providing the code comprises providing the code only to the customer.

14. The method of claim 1 further comprising creating a record indicating that the asserted code matches the code.

15. The method of claim 1 wherein the delivery agent is trusted to select the goods from a plurality of goods and deliver the goods to the customer.

16. The method of claim 1 further comprising a verification agency receiving a request from a merchant to provide the code to the customer, and in response to receiving the request, the verification agency providing the code to the customer; and
a shipping agency receiving a request from the merchant to provide a parcel identifier, the parcel identifier being associated with the code and the goods, the shipping agency providing the parcel identifier to the customer and to the delivery agent.

17. The method of claim 1, wherein the delivery agent is not exposed to the code except from the customer.

18. An article of manufacture comprising:
non-transitory storage media having encoded thereon programming configured to cause processing circuitry to perform code verification processing comprising:
receiving a verification request from a delivery agent tendering delivery of goods to a customer, the verification request including an asserted code provided to the delivery agent by the customer;
determining whether the asserted code matches a code previously provided to the customer, the previously provided code being associated with the goods;
communicating a message comprising one or more words or symbols to the delivery agent in response to determining whether or not the asserted code is the code previously provided to the customer;
if the codes match, the message comprising one or more words comprising a directive for the delivery agent to physically transfer the goods to the customer; and
if the codes do not match, the message comprising one or more words comprising a directive for the delivery agent to not physically transfer the goods to the customer.

19. The article of manufacture of claim 18 wherein the verification request includes a parcel identifier uniquely identifying a parcel containing the goods, the parcel identifier being known by the delivery agent prior to sending the verification request and being associated with the code.

20. The article of manufacture of claim 19 wherein the combination of the parcel identifier and the code is unique.

21. An article of manufacture comprising:
non-transitory storage media having encoded thereon programming configured to cause processing circuitry to perform code verification processing comprising:
receiving an asserted code from a delivery agent, the delivery agent having obtained the asserted code from a customer;
transmitting the asserted code to a verification system, the verification system being configured to determine whether the asserted code matches a code previously provided to the customer, the previously provided code being associated with goods ordered by the customer; and
receiving a message comprising one or more words or symbols from the verification system in response to transmitting the asserted code to the verification system, the message comprising one or more words or symbols, further comprising a directive indicating whether the delivery agent is authorized to physically transfer the goods to the customer.

22. The article of manufacture of claim 21 wherein the processing further comprises informing the delivery agent whether the delivery agent is authorized to transfer the goods to the customer.

23. The article of manufacture of claim 21 wherein the delivery agent has no knowledge of the code prior to obtaining the asserted code from the customer.

24. The article of manufacture of claim 21 wherein the receiving the asserted code comprises reading a bar code provided by the customer.

25. The article of manufacture of claim 21 wherein the receiving comprises receiving the code via a keyboard.

* * * * *